United States Patent
Wen

(10) Patent No.: US 9,316,240 B2
(45) Date of Patent: Apr. 19, 2016

(54) CLAMPING ASSEMBLY

(71) Applicant: Qing-Song Wen, Shenzhen (CN)

(72) Inventor: Qing-Song Wen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 642 days.

(21) Appl. No.: 13/707,955

(22) Filed: Dec. 7, 2012

(65) Prior Publication Data

US 2013/0199002 A1 Aug. 8, 2013

(30) Foreign Application Priority Data

Feb. 4, 2012 (CN) .......................... 2012 1 0024193

(51) Int. Cl.
*B25B 1/00* (2006.01)
*F16B 2/10* (2006.01)
*B25B 5/12* (2006.01)

(52) U.S. Cl.
CPC ... *F16B 2/10* (2013.01); *B25B 5/12* (2013.01); *Y10T 24/44496* (2015.01)

(58) Field of Classification Search
USPC ........................................................... 269/86
See application file for complete search history.

(56) References Cited

U.S. PATENT DOCUMENTS

| | | | | | |
|---|---|---|---|---|---|
| 2,466,937 | A | * | 4/1949 | Downs | 269/143 |
| 2,473,764 | A | * | 6/1949 | Park | 24/513 |
| 2,617,458 | A | * | 11/1952 | Kelly | 81/372 |
| 2,929,422 | A | * | 3/1960 | Tyler et al. | 269/153 |
| 2,995,794 | A | * | 8/1961 | Hacking | 24/494 |
| 3,010,171 | A | * | 11/1961 | Blatt | 24/494 |
| 3,537,150 | A | * | 11/1970 | Emberson | 403/344 |
| 3,784,140 | A | * | 1/1974 | Auerbach | 248/214 |
| 3,799,533 | A | * | 3/1974 | Malott | 269/32 |
| 3,955,810 | A | * | 5/1976 | Travis | 269/238 |
| 4,305,575 | A | * | 12/1981 | Bardes | 269/41 |
| 4,344,215 | A | * | 8/1982 | Dearman | 29/281.5 |
| 4,475,728 | A | * | 10/1984 | Haddad | 269/94 |
| 4,617,710 | A | * | 10/1986 | Kotnik | 29/268 |
| 4,673,174 | A | * | 6/1987 | Tabbert | 269/41 |
| 4,747,588 | A | * | 5/1988 | Dillhoff | 269/6 |
| 4,955,766 | A | * | 9/1990 | Sommerfeld | 408/87 |
| 5,050,466 | A | * | 9/1991 | Cameron | 81/419 |
| 5,647,102 | A | * | 7/1997 | Sterling, Jr. | 24/494 |

(Continued)

FOREIGN PATENT DOCUMENTS

| | | |
|---|---|---|
| CN | 201586936 U | 9/2010 |
| JP | 2001334434 A | 12/2001 |
| KR | 20020000410 A | 1/2002 |

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A clamping assembly includes a base, a clamping block, a first linkage, and a second linkage. The clamping block includes a rotating portion and a clamping portion. The rotating portion is rotatably connected to the base. The clamping portion extends out from the rotating portion towards the base. The first linkage is rotatably connected to the base, and includes a first rod portion and a second rod portion extending from the first rod portion. The second linkage includes a third rod portion and a fourth rod portion extending from the third rod portion. The third rod portion rotatably connects with the first rod portion. The fourth rod portion rotatably connects with the rotating portion of the clamping block.

20 Claims, 4 Drawing Sheets

(56) References Cited

U.S. PATENT DOCUMENTS

| | | | | |
|---|---|---|---|---|
| 5,921,535 A | * | 7/1999 | Lutz, III | 269/228 |
| 6,158,729 A | * | 12/2000 | Tsai | 269/228 |
| 6,530,566 B1 | * | 3/2003 | DuVernay | 269/228 |
| 6,698,737 B1 | * | 3/2004 | Blessing | 269/55 |
| 6,877,731 B1 | * | 4/2005 | Corley, Sr. | 269/41 |
| 7,104,166 B1 | * | 9/2006 | Wong | 81/423 |
| 7,237,425 B1 | * | 7/2007 | Wadsworth et al. | 72/409.12 |
| 2009/0019678 A1 | * | 1/2009 | Taylor | 24/530 |

* cited by examiner

CLAMPING ASSEMBLY

BACKGROUND

1. Technical Field

The present disclosure relates to clamping assemblies, particularly to a clamping assembly configured with linkages, for clamping workpieces.

2. Description of Related Art

A clamping assembly clamps workpieces, for assembling, processing, or transmitting the workpieces. The clamping assembly may include a pair of clamping blocks connected by an adjustable screw, which enables the distance between the pair of clamping blocks to be adjusted. Therefore, a workpiece may be clamped between the clamping blocks. However, during the clamping of the clamping assembly, the screw must be adjusted to allow the clamping blocks to provide a suitable distance for the workpiece, which results in a complex operation. In addition, when the clamping assembly needs to clamp or release workpieces frequently, it is a waste of time and leads to having lowered efficiency.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
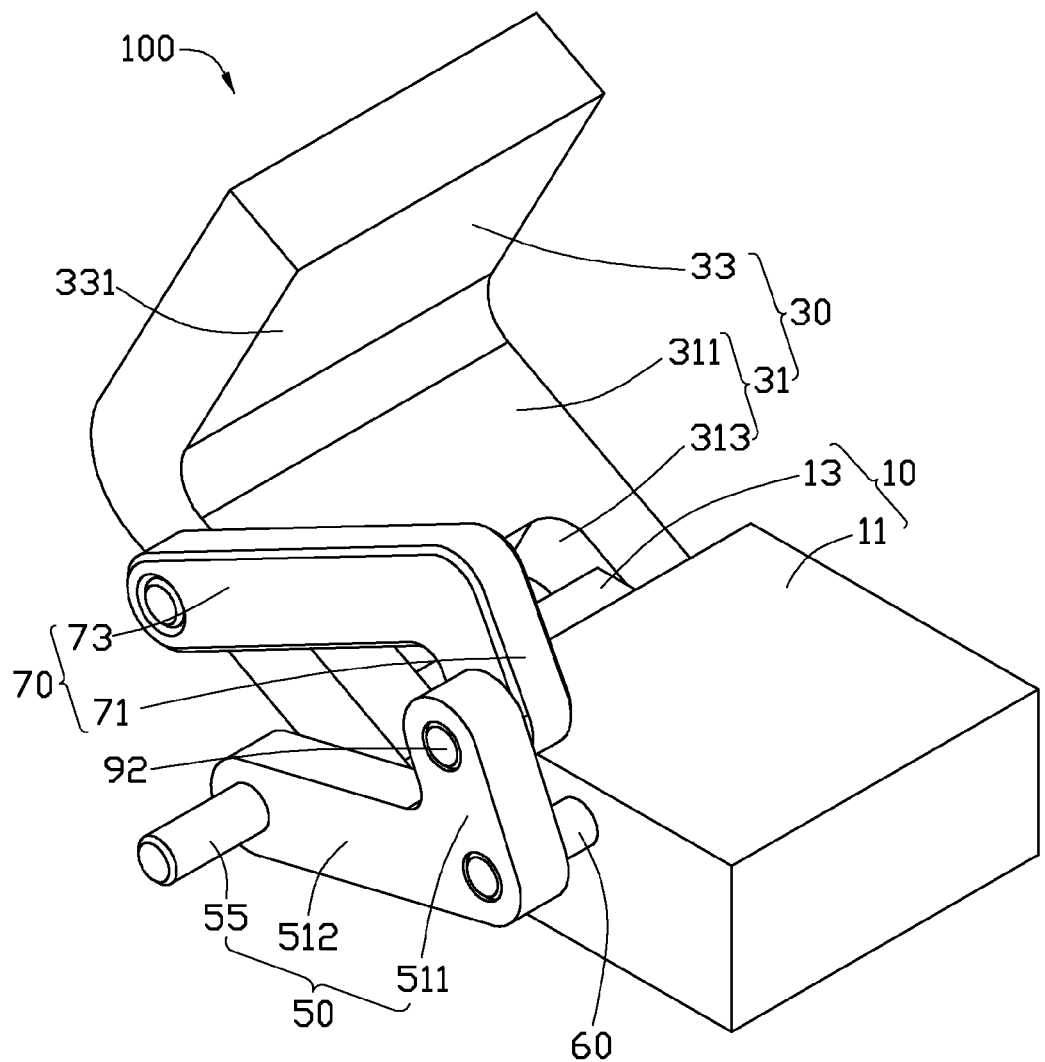
FIG. 1 is an isometric view of an embodiment of a clamping assembly.
Figure 2:
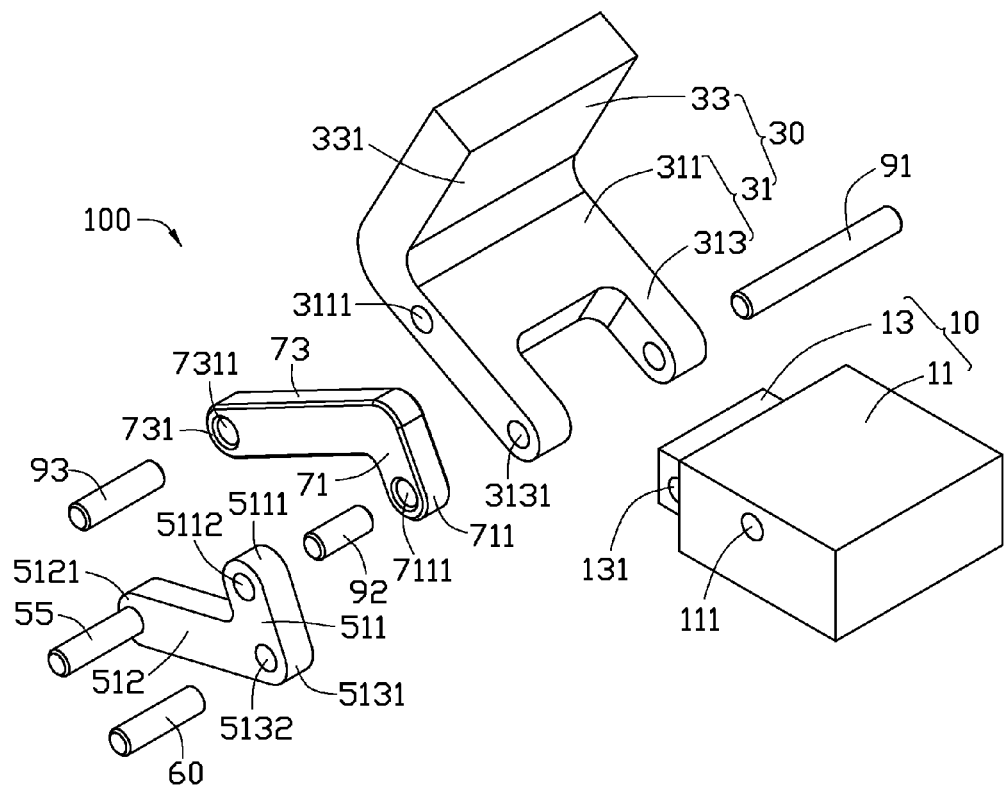
FIG. 2 is an exploded, isometric view of the clamping assembly shown in FIG. 1.
Figure 3:
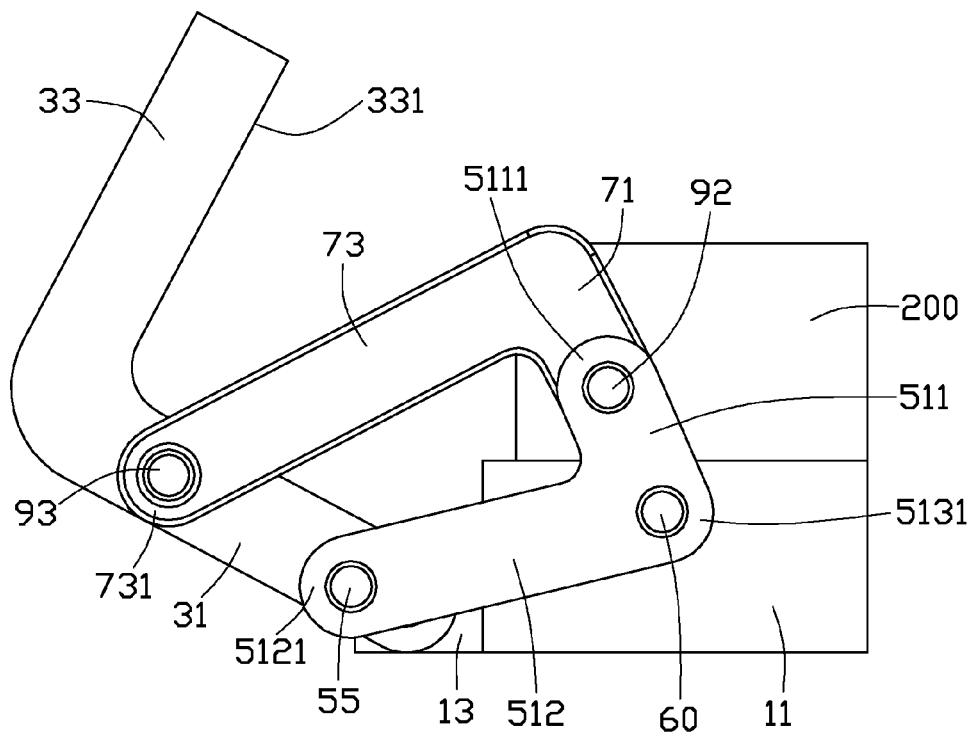
FIG. 3 is a side view of a first working state of the clamping assembly shown in FIG. 1.

FIGS. 1 through 3 show a clamping assembly 100, for clamping a workpiece 200. The clamping assembly 100 includes a base 10, a clamping block 30, a first linkage 50, a shaft rod 60, a second linkage 70, a first pivot member 91, a second pivot member 92, and a third pivot member 93. The clamping block 30 is rotatably connected to the base 10 via the first pivot member 91. The first linkage 50, the shaft rod 60, the second linkage 70, the second pivot member 92, and the third pivot member 93 are located at a same side of the base 10 and the clamping block 30. In the illustrated embodiment, the first pivot member 91, the second pivot member 92, and the third pivot member 93 are pins.

The base 10 is substantially cubic, and includes a main body 11 and a mounting portion 13 outwardly extending from an end of the main body 11. The main body 11 is substantially cubic, and defines an inserting hole 111 at a side surface thereof. The mounting portion 13 is substantially cubic, and the mounting portion 13 is thinner in height than the main body 11. The mounting portion 13 defines a mounting hole 131 therethrough. The mounting hole 131 is parallel to the inserting hole 111.

The clamping block 30 is substantially an L-shaped block, and includes a rotating portion 31 and a clamping portion 33. The rotating portion 31 is mounted on the mounting portion 13, and includes a base body 311 and a pair of fixing arms 313 extending from an end of the base body 311 opposite to the clamping portion 33. The base body 311 is substantially cubic, and defines a connecting hole 3111 at a side surface thereof, and the connecting hole 3111 is at a same side of the clamping block 30 as the inserting hole 111 of the base 10. Each of the fixing arms 313 defines a through hole 3131 corresponding to the mounting hole 131. The mounting portion 13 is sandwiched between the pair of fixing arms 313, and the mounting hole 131 aligns with the through holes 3131. The first pivot member 91 is inserted into the mounting hole 131 and the through holes 3131, to rotatably connect the fixing arms 313 with the mounting portion 13. The clamping portion 33 perpendicularly extends from an end of the rotating portion 31 towards the base 10, and includes a resisting surface 331 towards the rotating portion 31, for providing a resistance to the workpiece 200 when clamping the workpiece 200.

The first linkage 50 is mounted to the main body 11, and includes a first rod portion 511, a second rod portion 512, and a handing portion 55. The second rod portion 512 is bent from one end of the first rod portion 511, and, in cooperating with the first rod portion 511, defines a substantial L-shape. The handing portion 55 is mounted on the second rod portion 512. The first rod portion 511 includes a first end 5111 away from the second rod portion 512, and the second rod portion 512 includes a second end 5121 away from the first rod portion 511, and a bending end 5131 is formed at an adjoining portion of the first rod portion 511 and the second rod portion 512. The first end 5111 defines a first through hole 5112, and the bending end 5131 defines a second through hole 5132 parallel to the first through hole 5112. The handing portion 55 is substantially a rod, and is fixed on a surface of the second end 5121 away from the main body 11. In other embodiments, the first rod portion 511 may intersect with the second rod portion 512 at an acute angle or an obtuse angle. The handing portion 55 may be another shape, such as cuboid, for example.

The shaft rod 60 connects the first linkage 50 with the base 10. In the illustrated embodiment, the shaft rod 60 is a pin, and an end of the shaft rod 60 is inserted into the second through hole 5132, another end of the shaft rod 60 is inserted into the inserting hole 111, such that the first linkage 50 is rotatable relative to the main body 11.

The second linkage 70 is rotatably connected to the clamping block 30 and the first linkage 50, and includes a third rod portion 71 and a fourth rod portion 73. The fourth rod portion 73 extends from an end of the third rod portion 71, and in cooperating with the third rod portion 71 defines a substantial L-shape. The third rod portion 71 includes a first distal end 711 away from the fourth rod portion 73. The fourth rod portion 73 includes a second distal end 731 away from the third rod portion 71. The first distal end 711 defines a first opening 7111, and the second distal end 731 defines a second opening 7311 parallel to the first opening 7111. The second linkage 70 is located between the base 10 and the first linkage 50, and the third rod portion 71 is rotatably connected to the first rod portion 511 and the fourth rod portion 73 is rotatably connected to the rotating portion 31. In the illustrated embodiment, the first distal end 711 pivots with the first end 5111 via the second pivot member 92 being inserted into the first through hole 5112 and the first opening 7111. The second distal end 731 pivots with the rotating portion 31 via the third pivot member 93 being inserted into the second opening 7311 and the connecting hole 3111. In other embodiments, the third rod portion 71 intersects with the fourth rod portion 73 at an acute angle or an obtuse angle.

In use, the handing portion 55 is grasped in the fingers and pushed towards the clamping block 30 (anticlockwise), to enable the first linkage 50 to rotate relative to the shaft rod 60. The first rod portion 511 drives the first distal end 711 of the second linkage 70 to rotate relative to the second pivot member 92 towards the clamping block 30. The fourth rod portion 73 of the second linkage 70 drives the clamping portion 30 to rotate relative to the first pivot member 91 away from the base 10, thus the clamping portion 33 moves away from the base 10 and receives the workpiece 200. The workpiece 200 is placed on the main body 11 and the clamping assembly 100 is thus arrived at a first usage state (shown in FIG. 3).

Figure 4:
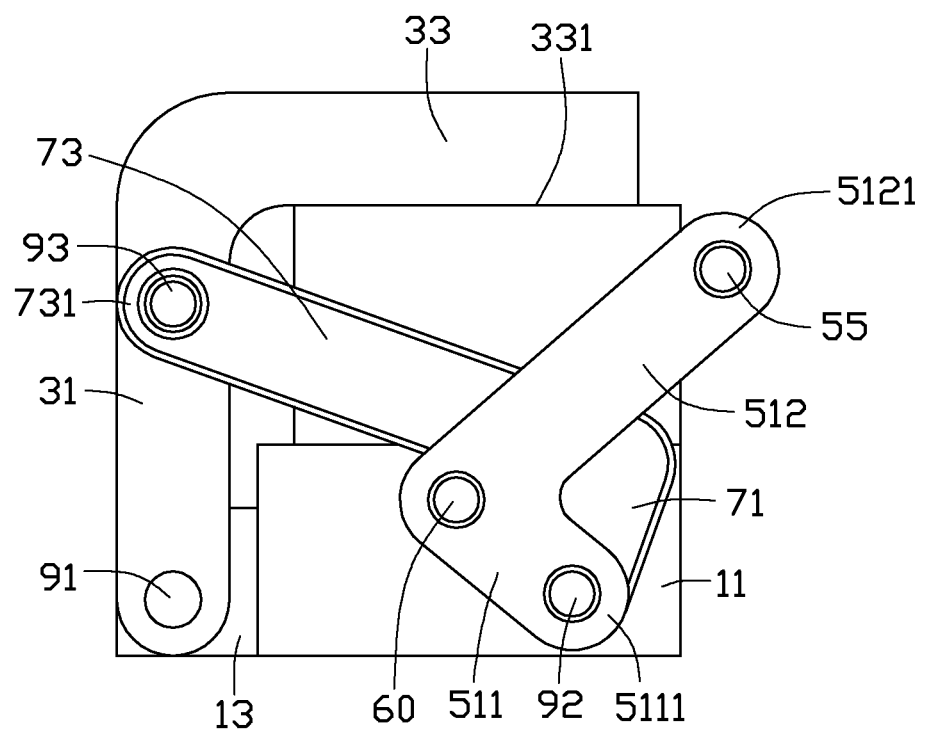
FIG. 4 is similar as FIG. 3, but showing a second working state of the clamping assembly clamping a workpiece shown in FIG. 1.

Then, the handing portion 55 is grasped and pushed away from the clamping block 30 (clockwise direction), to enable the first rod portion 511 to drive the first distal end 711 of the second linkage 70 to rotate relative to the second pivot member 92 away from the clamping block 30. The fourth rod portion 73 of the second linkage 70 drives the clamping portion 30 to rotate relative to the first pivot member 91 towards the base 10, and thus the clamping portion 33 moves towards the main body 11 until the resisting surface 331 resists the main body 11. At the same time, the shaft rod 60 resists the second linkage 70, preventing further rotation by the second linkage 70. Thereby, the clamping block 30 clamps the workpiece 200, and the clamping assembly 100 is locked. The clamping assembly 100 is thus arrived in a second usage state (shown in FIG. 4).

In other embodiments, when a top surface of the workpiece 200 is not planar, the resisting surface 331 may be in a shape corresponding to the top surface of the workpiece 200, for stable clamping of the workpiece 200.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A clamping assembly, comprising:
   a base;
   a clamping block comprising a rotating portion and a clamping portion, the rotating portion rotatably connected to the base, the clamping portion extending out from the rotating portion towards the base;
   a first linkage comprising a first rod portion and a second rod portion extending from the first rod portion, the first rod portion intersecting with the second rod portion, wherein the first rod portion comprises a first end away from the second rod portion, the second rod portion comprises a second end away from the first rod portion, and a bending end is formed at a connecting portion of the first rod portion and the second rod portion;
   a shaft rod rotatably connecting the first linkage and the base; and
   a second linkage comprising a third rod portion and a fourth rod portion extending from the third rod portion, the third rod portion rotatably connecting with the first rod portion, the fourth rod portion rotatably connected to the rotating portion of the clamping block, wherein the third rod portion is rotatably connected to the first end of the first rod portion, and the bending end is rotatably connected to the base via the shaft rod.

2. The clamping assembly of claim 1, wherein the first linkage further comprises a handing portion mounted on a surface of a second end of the second rod portion away from the base.

3. The clamping assembly of claim 1, wherein the third rod portion comprises a first distal end away from the fourth rod portion, the fourth rod portion comprises a second distal end away from the third rod portion, the first distal end is rotatably connected to the first end of the first rod portion, the second distal end is rotatably connected to the rotating portion of the clamping block.

4. The clamping assembly of claim 1, wherein the base comprises a main body and a mounting portion extending from an end of the main body, the rotating portion is rotatably connected to the mounting portion.

5. The clamping assembly of claim 4, wherein the rotating portion comprises a base body connecting with the clamping portion, and a pair of fixing arms extending from the base body away from the clamping portion, the fixing arms are rotatably connected to the mounting portion.

6. The clamping assembly of claim 5, wherein the clamping assembly further comprises a first pivot member, the fixing arms are rotatably connected to the mounting portion via the first pivot member.

7. The clamping assembly of claim 1, wherein the clamping assembly further comprises a second pivot member, the third rod portion is rotatably connected to the first rod portion via the second pivot member.

8. The clamping assembly of claim 1, wherein the clamping assembly further comprises a third pivot member, the fourth rod portion is rotatably connected to the rotating portion via the third pivot member.

9. The clamping assembly of claim 1, wherein the third rod portion is perpendicular to the fourth rod portion.

10. A clamping assembly, comprising:
    a base;
    a clamping block comprising a rotating portion and a clamping portion, the rotating portion rotatably connected to the base, the clamping portion extending from the rotating portion towards the base;
    a first linkage rotatably connected to the base, and comprising a first rod portion and a second rod portion extending from the first rod portion, the first rod portion intersecting with the second rod portion; and
    a second linkage comprising a third rod portion and a fourth rod portion extending from the third rod portion, the third rod portion rotatably connecting with the first rod portion, the fourth rod portion rotatably connected to the rotating portion of the clamping block, wherein the third rod portion intersects with the fourth rod portion, the third rod portion comprises a first distal end away from the fourth rod portion, the fourth rod portion comprises a second distal end away from the third rod portion, the first distal end is rotatably connected to the first rod portion, and the second distal end is rotatably connected to the rotating portion of the clamping block.

11. The clamping assembly of claim 10, wherein the first rod portion comprises a first end away from the second rod portion, the second rod portion comprises a second end away from the first rod portion, a bending end is formed at a connecting portion of the first rod portion and the second rod portion, the third rod portion is rotatably connected to the first end of the first rod portion, the bending portion is rotatably connected to the base via a shaft rod.

12. The clamping assembly of claim 11, wherein the first linkage further comprises a handing portion mounted on a surface of the second end of the second rod portion away from the base.

13. The clamping assembly of claim 10, wherein the base comprises a main body and a mounting portion extending from an end of the main body, the rotating portion is rotatably connected to the mounting portion.

14. The clamping assembly of claim 13, wherein the rotating portion comprises a base body connecting with the clamping portion, and a pair of fixing arms extending from the base body away from the clamping portion, the fixing arms are rotatably connected to the mounting portion.

15. The clamping assembly of claim 14, wherein the clamping assembly further comprises a first pivot member, the fixing arms are rotatably connected to the mounting portion via the first pivot member.

16. The clamping assembly of claim 10, wherein the clamping assembly further comprises a second pivot member, the third rod portion is rotatably connected to the first rod portion via the second pivot member.

17. The clamping assembly of claim 10, wherein the clamping assembly further comprises a third pivot member, the fourth rod portion is rotatably connected to the rotating portion via the third pivot member.

18. The clamping assembly of claim 10, wherein the third rod portion is perpendicular to the fourth rod portion.

19. A clamping assembly comprising:
a base;
a clamping block comprising a rotating portion rotatably connected to the base and a clamping portion extending from the rotating portion towards the base;
a first linkage rotatably connected to the base and comprising a first rod portion and a second rod portion extending from the first rod portion; and
a second linkage comprising a third rod portion rotatably connecting with the first rod portion and a fourth rod portion extending from the third rod portion and rotatably connected to the rotating portion of the clamping block, wherein the third rod portion is perpendicular to the fourth rod portion.

20. The clamping assembly of claim 19, wherein the clamping assembly further comprises a second pivot member, the third rod portion is rotatably connected to the first rod portion via the second pivot member.

* * * * *